United States Patent [19]

Nablo et al.

[11] Patent Number: 4,521,445
[45] Date of Patent: Jun. 4, 1985

[54] METHOD AND APPARATUS FOR ELECTRON CURING ON A COOLED DRUM

[75] Inventors: Sam V. Nablo, Lexington; Edwin P. Tripp, III, Wilmington, both of Mass.

[73] Assignee: Energy Sciences, Inc., Woburn, Mass.

[21] Appl. No.: 487,461

[22] Filed: Apr. 22, 1983

[51] Int. Cl.³ .............................................. B05D 3/06
[52] U.S. Cl. ...................................... 427/44; 264/22; 264/216; 427/147; 250/492.3
[58] Field of Search .................. 427/44, 54.1, 147; 264/22, 216; 250/492.3

[56] References Cited

U.S. PATENT DOCUMENTS

| | | | |
|---|---|---|---|
| 4,246,297 | 1/1981 | Nablo et al. | 427/44 |
| 4,252,413 | 2/1981 | Nablo | 250/310 |
| 4,294,782 | 10/1981 | Froehlig | 264/106 |
| 4,322,450 | 3/1982 | Gray et al. | 427/54.1 |
| 4,364,971 | 12/1982 | Sack et al. | 427/44 |

FOREIGN PATENT DOCUMENTS 2705273  8/1978  Fed. Rep. of Germany ...... 118/642

*Primary Examiner*—John H. Newsome
*Attorney, Agent, or Firm*—Rines and Rines, Shapiro and Shapiro

[57] ABSTRACT

This disclosure is concerned with a method of transfer-coating electron-beam-curable materials, by applying such materials to the surface of a cooled drum, either through a sheet or web carrying the same over the drum or from the drum surface itself, curing the material against the drum at a region of electron-beam radiation directed thereupon and releasing the cured material from the drum surface; and with the latter, where desired, reflecting radiation back into the material being cured.

27 Claims, 6 Drawing Figures

METHOD AND APPARATUS FOR ELECTRON CURING ON A COOLED DRUM

The present invention relates to electron-beam curing techniques and apparatus, being more particularly concerned with curing transfer coatings and other electron-beam-curable materials such as printing inks, film coatings, magnetic tape materials, transfer metallization of paper and other substrates, and similar applications where release layers or surfaces and/or cooling by such surfaces is required or desirable.

In prior U.S. Pat. No. 4,246,297 of Energy Sciences Inc., the common assignee of the present invention, it was disclosed that the penetrating capabilities of energetic electrons enabled them to cure "buried" electron-beam-curable coatings on products made of paper, fabric and similar thin substrates i.e. (thickness $\leq 400$ g/m$^2$). In these cases, electrons of modest energy ($E \leq 300$ keV) can readily penetrate the product and uniformly irradiate the coating, which may be in contact with a release surface. Examples were shown, in the above referenced patent, of such transfer coating art, using a release paper with irradiation effected either through the product substrate itself, or through the release paper. In accordance with discoveries underlying the present invention, the necessity for such release papers or the like is eliminated by the use of a drum release surface which at the same time, unlike prior release layers, may be cooled for necessary process control in the particular application—despite the at first blush contraindication of directing electron beam energy at a metallic or similar drum.

Drums have been used for other purposes in electron processors, as shown in our prior U.S. Pat. No. 4,252,413 wherein a web is presented continuously to an electron beam so that the environmental conditions (radiation levels, ozone concentration, oxygen concentration in the process zone, process temperature, etc.) can be precisely controlled for successful practice of the art on an industrial scale. Among the techniques discussed in this patent, particularly for high speed graphics applications, is the use of a roller which serves to remove heat from the film or web while it remains in contact with the roller surface, and at the same time provides a compact shielding geometry. This use of roller or drum-like surfaces, however, while an assist in cooling, has nothing to do with coating transfer and related applications.

The invention disclosed herein utilizes, to the contrary, the transfer coating art of U.S. Pat. No. 4,246,297 (which employs film, foil or release paper surface control as a release liner) in conjunction with an under-beam chilled roll concept to attain simultaneous coating release and cooling functions in a totally novel and unexpected manner and eliminates release papers or similar films.

An object of the invention, accordingly, is to provide a new and improved method of and apparatus for electron curing, particularly adapted for release-coating applications as well as other uses, that obviates the necessity for release papers, films, foils and the like and also enables facile process cooling simultaneously with release functions.

In summary, from one of its viewpoints, the invention embraces a method of transfer-coating electron-beam-curable materials, that comprises, applying such materials to the surface of a drum; rotating the drum past a region where electron-beam radiation is directed thereupon, to cure the material against the drum; and releasing the cured material from the drum surface. Preferred and best mode embodiments are hereinafter described.

A further object is to provide a novel electron-beam curing structure of more general applicability as well.

Other and further objects will be explained hereinafter and are more fully delineated in the appended claims.

The invention will now be described with reference to the accompanying drawings, FIG. 1 of which is a schematic transverse cross-section illustrating the invention applied to electron-beam curing against a drum;

Figure 1:
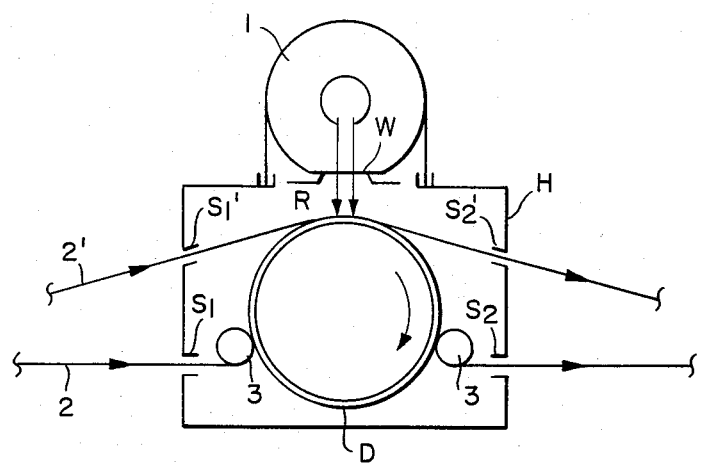

Referring to FIG. 1, an electron-beam processor as of the types described in said patents and marketed by the assignee of the present invention, Energy Sciences Inc., under the trademarks "Electrocurtain" and "Self-shield", is shown at 1, directing its beam downwardly (vertical arrows) through an electron-impervious window W upon a region R within a shielded enclosure H as of the type described in said U.S. Pat. No. 4,252,413. Sheet material 2 is shown passed by rollers 3 through inlet and outlet slots $S_1$ and $S_2$ within the enclosure H over an internally water-chilled or otherwise cooled drum D, as of metal surface, later described, receiving electron beam radiation at the top region R, at which a web $2^1$, passed through inclined inlet and outlet slots $S_1^1$ and $S_2$hu 1, contacts the sheet 2 with coating or other material to be electron-beam cured.

As shown in FIG. 1, the polished water-cooled drum D is positioned below the beam and, because of its inertia, is driven mechanically so that its surface velocity is synchronized with that of the product on which the coating is to be cured. The chilled drum D may contain no additional shielding since it is housed inside the shielded assembly H to prevent the escape of radiation generated by the stopping of the beam in the product or in the drum. Since certain applications may require visual access to the drum surface, it may also include a shielding liner, as later described in connection with the embodiment of FIG. 2, such as lead, tantalum, etc.) which, in conjunction with the outer shield provides a suitable dose rate reduction, in accordance with the design criteria taught in said U.S. Pat. No. 4,252,413, that the radiation levels at the infeed and outfeed slots 2, 2′, etc. readily comply with the regulations for processor use.

Figure 2:
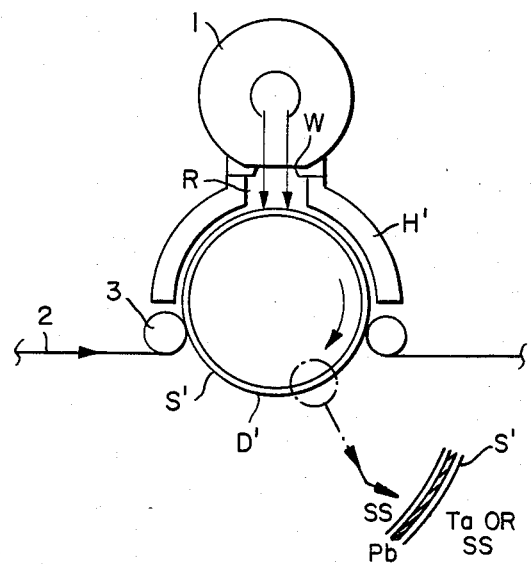
FIG. 2 is a similar view showing the technique applied to curing against a shielded, cooled drum.

In the embodiment of FIG. 2, the cooled drum D' is shown itself provided with a shielded surface S', the details of which are shown expanded to the right, with coated sheet material 2 passed over the drum for electron-beam curing at region R within an upper shielded housing portion H', as described in said U.S. Pat. No. 4,252,413. The surface S' may be constructed of successive layers of lead, tantalum and stainless steel. Such a system is particularly useful for curing complex functional coatings against the cooled drum D', such as those used in magnetic or optical recording tapes, providing for the reduction or elimination of the need for calendering of the cured film due to the surface quality provided through the technique of the invention. Particle orientation in the coatings can take place directly on the drum D' between slurry application and cure at R; either over the contact angle while the coated sheet or film 2 is in contact with the top of the drum D', or while the same is in contact with a coating provided to the lower portion of the drum and carried upward as in the embodiment of FIG. 3.

Figure 3:
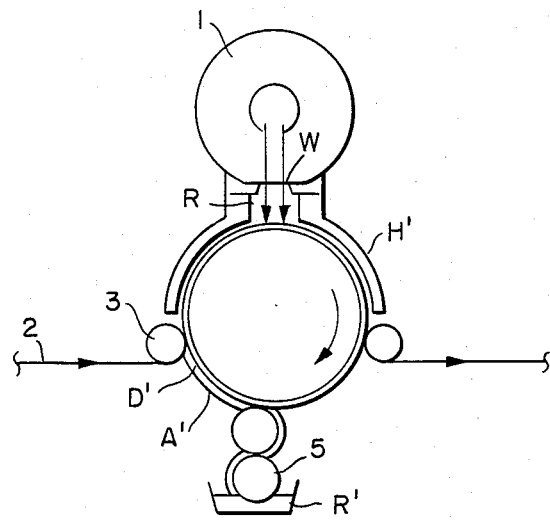
FIG. 3 is a similar view of a modified electron-beam transfer coating and drum curing system using the principles of the invention.

Turning to FIG. 3, the coating A' is shown applicable to the bottom region of the drum D' by roller applicators 5 contacting a coating reservoir R', such that the sheet or web 2 contacts the drum-carried coating A' near region R and the curing is effected against the drum D' and released or transferred therefrom as a cured coating on the sheet 2. The upper shielding at H' may be as in FIG. 2.

Other advantages of the design of FIG. 3 reside in the fact that the shielded drum is incorporated into a separable shield assembly which provides visual access to the rotating drum surface in the closed condition and full access to the drum-electron processor window assembly in the opened condition. Because of the very slender access channel required for the processing of film, paper, textiles, etc., the substrates of prime interest for the processes made possible with this geometry, a very efficient shielding geometry is possible for the absorption of x-rays. Shields such as that shown in FIG. 3 have been constructed which show no measurable radiation at the access slots with the electron processor at full power (say 1–2 kilowatts of beam power per inch of process zone width). Visual access to the coating station is a prime advantage offered by this arrangement.

While a cooled drum D' can clearly remove heat from a thin web 2 in contact with it, unexpected process advantages of such a geometry have been found that are unique to electron-initiated addition polymerization reactions, such as are used in the application of these processors to transfer coating of paper, film and foil, for example. As explained in said U.S. Pat. No. 4,246,297, the penetrating ability of electrons may be used to reach the coatings applied to the reverse side of a substrate-to-be-coated; the coatings themselves being in contact with a release liner or sheet against which they are cured. Various schemes for transfer coating and film coating are therein described; but none is adapted to employ simultaneous cooling, or to eliminate the need for separate release surfaces or sheets, or to enable electron reflection or scatter back into the coating-to-be-cured. It is these advantages which the present invention for the first time affords through utilizing the surface of the cooled drum as the release "liner" itself on a continous basis, and with no need for a replaceable liner or release sheet, as heretofore practiced for textile and paper transfer coating using conventional technologies normally employing condensation polymerization.

Some of the unexpected advantages of the synchronized drum technique of the invention for the curing of coatings on paper, film, foil, textiles, etc. have become evident in curing studies conducted on such "Electrocurtain" assemblies using in-line coating techniques unique to thse studies. Among these are the fact that temperature control of the web can be precise, in that for thin webs the substrate will be reduced to the drum temperature even at very high speeds. Such a system has been used for detailed study of these effects in magnetic tape, for example, with the drum outside the shield housing to permit precise measurements of the dynamic temperature behavior of the tape or film as a function of various process parameters. For example, for some electron-initiated reactions, it may be desirable to maintain the system temperature well above ambient, but at levels well below the distortion temperature of the tape or film or other sheets. This can now be accomplished by precise monitoring and control of the drum surface temperature with the geometries of the structures of the invention.

Inerting of the coating surface is eliminated since the coating is now in the protected, "closed" zone between the substrate and the drum surface. In addition, any homopolymer formed from the monomer in the coating during the curing process, or any other light coating fractions which would volatilize under normal "coating up" curing, are now held against the substrate-coating surface and will be reacted into the coating with a higher probability. These effects of monomer trapping, etc. lead to a much cleaner curing environment from both operational processor as well as ecological, points of view.

The advantageous effects of electron backscatter, generically described in U.S. Pat. No. 4,246,297, are optimized in the constructions of the present invention. High atomic number coatings as at 5' in FIG. 2, can be utilized on the drum surface to enhance recovery of this albedo energy, which is now absorbed with high efficiency in the coating or binder layer.

Figure 4:
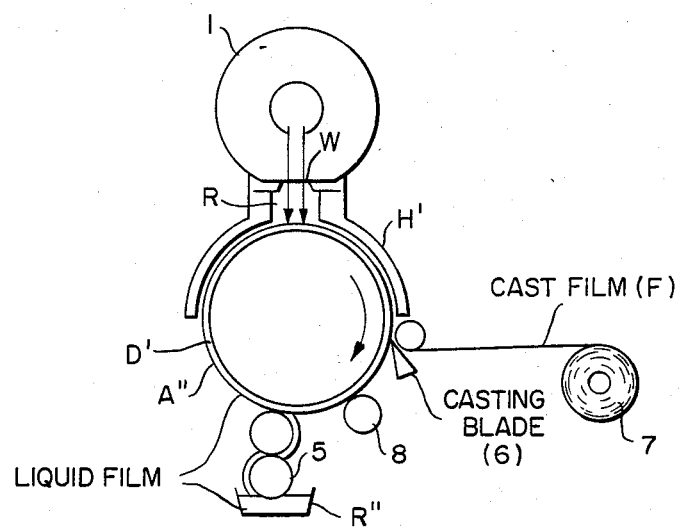
FIGS. 4, 5 and 6 respectively illustrate, in similar fashion, various electron-beam film casting arrangements utilizing the drum curing of the invention.

The invention also enables ready electron-beam film casting with its drum technique, as shown in FIG. 4. Liquid film A" from a reservoir R" is applied by applicator rolls 5 to the drum D' at its lowermost region and is subjected to electron-beam curing at top region R within the shielded upper housing H', passing then over a casting blade 6 to release or transfer from the drum D' a cast film F that may then be wound at station 7. For such film casting (or transfer coating as in other embodiments) the drum D' may be continuously cleaned at 8 as it returns from the film transfer point (where the substrate or film leaves the drum surface) to the point where the liquid coating is being continuously applied to the drum surface from reservoir R".

In these and other applications, the invention eliminates the need for consumable release liner or sheet which has an important impact on the economics of transfer coating of flexible or semiflexible webs such as paper, paperboard, non-wovens, film, foil, textiles, etc. Surface texturizing of the web, moreover, is readily accomplished by the etching or engraving of the drum surface. Differential drum-web speeds may also be used to provide special texturing effects in the coating, in much the same way as differential web-transfer roll speeds are used in offset gravure coating.

Unusual hold-out advantages are possible with the geometries of FIGS. 1 and 2 in that very short dwell times of the coating on the substrate prior to cure are possible, assisting in high gloss surfaces as taught in copending U.S. patent application No. 899,493; and the geometries described herein greatly enhance these advantages under precisely controllable conditions.

Figure 5:
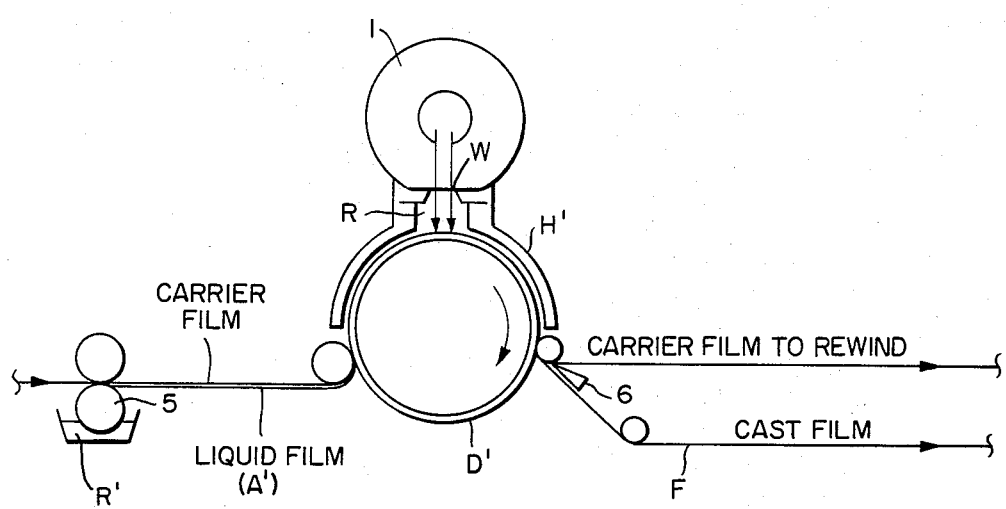
Figure 6:
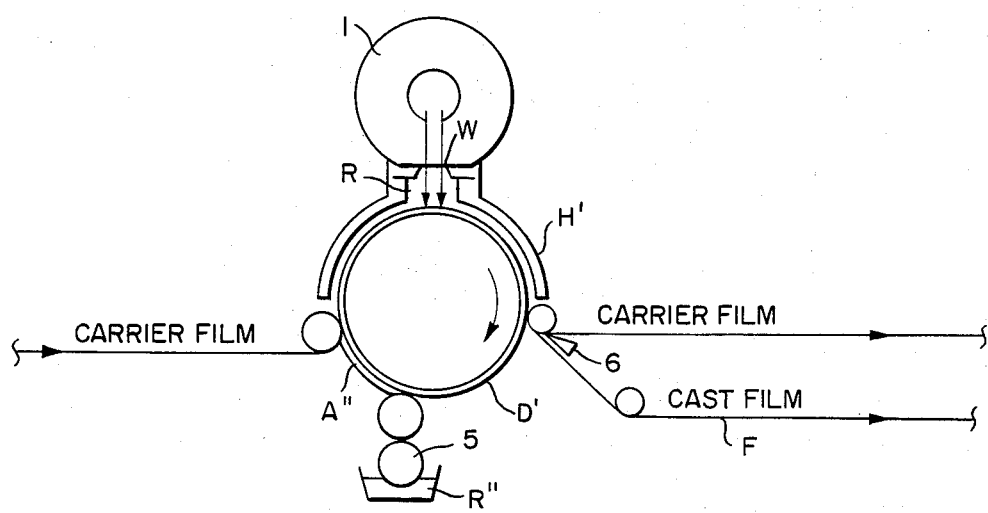

Other uses of the techniques of the invention for transfer casting of films are shown in FIGS. 5 and 6. These techniques also permit the optimization of processes for the generation of unique, fault-free films for dielectric applications (capacitor film) and the like. In the embodiment of FIGS. 5 and 6, electron-beam curable coatings are applied to carrier films before and during passage over the drum D', respectively, with the carrier being separated by casting blades 6 from the electron beam cast film F to the right of the curing region R.

Further modifications will occur to those skilled in this art and such are considered to fall within the spirit and scope of the invention as defined in the appended claims.

What is claimed is:

1. A method of transfer-coating electron-beam-curable material, that comprises, drawing over the external surface of a rotating metal drum a first web carrying such material, drawing a second web past the drum in contact with the first web at a predetermined region adjacent to the external surface of the drum, and directing electron-beam radiation upon said region from a location external to the drum to cure said material and transfer the same to said second web.

2. A method in accordance with claim 1, wherein the drum is cooled.

3. A method of transfer-coating electron-beam-curable material, that comprises applying said material to the external surface of a rotary metal drum, rotating said drum past a region where elctron-beam radiation is directed upon the external surface of the drum from a location external to the drum to cure said electron-beam-curable material, and providing sufficient shielding in the material of the drum itself to prevent appreciable radiation generated by the stopping of the electron beam radiation in said electron-beam-curable material and the drum from passing through the drum to the side of the drum opposite to said region and to reduce the radiation level at said side of the drum to no more than 2.5 mr/hr for electron-beam radiation up to 300 KEV energy level.

4. A method in accordance with claim 3, wherein the electron-beam-curable material is applied directly to the external surface of the drum.

5. A method in accordance with claim 4, wherein a web is drawn over the external surface of said drum in contact with said electron-beam-curable material at said region and wherein said material is cured through said web to form a coating on said web.

6. A method in accordance with claim 3, wherein the electron-beam-curable material is applied to the external surface of the drum on a web drawn about the external surface of the drum.

7. A method in accordance with claim 3, wherein electron-beam-curable material cured by the electron-beam radiation is stripped from the drum as a self-supporting cast film.

8. A method of transfer-coating electron-beam-curable material, that comprises applying said material to the external surface of a rotary metal drum, rotating said drum past a region where electron-beam radiation is directed upon the external surface of the drum from a location external to the drum to cure said electron-beam-curable material, and providing sufficient shielding in the material of the drum itself to prevent appreciable radiation generated by the stopping of the electron beam radiation in said electron-beam-curable material and the drum from passing through the drum, the electron-beam-curable material cured by the electron-beam radiation being stripped from the drum as a cast film, the electron-beam-curable material being applied to the external surface of the drum by pre-coating a carrier film drawn about the drum, and the cast film being separated from the carrier film after curing of the electron-beam-curable material.

9. A method of transfer-coating electron-beam-curable material, that comprises applying said material to the external surface of a rotary metal drum, rotating said drum past a region where electron-beam radiation is directed upon the external surface of the drum from a location external to the drum to cure said electron-beam-curable material, and providing sufficient shielding in the material of the drum itself to prevent appreciable radiation generated by the stopping of the electron beam radiation in said electron-beam-curable material and the drum from passing through the drum, the electron-beam-curable material cured by the electron-beam radiation being stripped from the drum as a cast film, the electron-beam-curable material being applied directly to the external surface of the drum and being covered by a carrier film drawn about the drum, and the cast film being separated from the carrier film after curing of the electron-beam-curable material.

10. A method in accordance with claim 3, wherein the drum is cooled.

11. A method of transfer-coating electron-beam-curable material direct, that comprises, applying said material to the external surface of a rotary metal drum, rotating the drum past a region where electron-beam-radiation is directed thereupon from a location external to the drum to cure the material against the drum, and stripping the cured material from the drum as a cast self-supporting film.

12. A method of transfer-coating electron-beam-curable material, that comprises, applying said material to the external surface of a rotary metal drum, rotating the drum past a region where electron-beam-radiation is directed thereupon from a location external to the drum to cure the material against the drum, and stripping the cured material from the drum as a cast film, the electron-beam-curable material being applied to the external surface of the drum by precoating a carrier film drawn about the drum, and the cast film being separated from the carrier film after curing of the electron-beam-curable material.

13. A method of transfer-coating electron-beam-curable material, that comprises, applying said material directly to the external surface of a rotary metal drum, rotating the drum past a region where electron-beam-radiation is directed thereupon from a location external to the drum to cure the material against the drum, and stripping the cured material from the drum as a cast film, the applied material being covered by a carrier film drawn about the drum, and the cast film being separated from the carrier film after curing of the electron-beam-curable material.

14. Apparatus for transfer-coating electron-beam-curable material, that comprises, a rotary metal drum, means for drawing over the external surface of said drum a first web carrying such material, means for drawing a second web past the drum in contact with the first web at a predetermined region adjacent to the external surface of the drum, and means for impinging electron-beam radiation upon said region from a location external to said drum to cure said material and transfer the same to said second web.

15. Apparatus in accordance with claim 14, wherein the drum has means for cooling the same.

16. Apparatus for transfer-coating electron-beam-curable material, that comprises a rotary metal drum, means for applying an electron-beam-curable material to the external surface of said drum, and means for impinging electron-beam-radiation upon said external surface of the drum from a location external to the drum to cure said electron-beam-curable material, the material of the drum itself being sufficiently shielding to prevent appreciable radiation generated by the stopping of the electron beam radiation in said electron-beam-curable material and the drum from passing through the drum to the side of the drum opposite to said location and to reduce the radiation level at said side of the drum to no more than 2.5 mr/hr for electron-beam radiation up to 300 KEV energy level.

17. Apparatus in accordance with claim 16, wherein said applying means applies the electron-beam-curable material directly to the external surface of the drum.

18. Apparatus in accordance with claim 17, further comprising means for drawing a web over the external surface of said drum in contact with said electron-beam-curable material where the electron-beam-radiation impinges upon the external surface of the drum so that said material is cured through said web and forms a coating thereon.

19. Apparatus in accordance with claim 16, wherein said applying means applies the electron-beam-curable material to the external surface of the drum on a web drawn about the external surface of the drum.

20. Apparatus in accordance with claim 16, including means for stripping the electron-beam-curable material cured by the electron-beam radiation from the drum as a self-supporting cast film.

21. Apparatus for transfer-coating electron-beam-curable material, that comprises a rotary metal drum, means for applying an electron-beam-curable material to the external surface of said drum, means for impinging electron-beam-radiation upon said external surface of the drum from a location external to the drum to cure said electron-beam-curable material, the material of the drum itself being sufficiently shielding to prevent appreciable radiation generated by the stopping of the electron beam radiation in said electron-beam-curable material and the drum from passing through the drum, and means for stripping the electron-beam-curable material cured by the electron-beam-radiation from the drum as a cast film, said applying means applying the electron-beam-curable material to the external surface of the drum by pre-coating a carrier film drawn about the drum, and said stripping means separating the cast film from the carrier film after curing of the electron-beam-curable material.

22. Apparatus for transfer-coating electron-beam-curable material, that comprises a rotary metal drum, means for applying an electron-beam-curable material to the external surface of said drum, means for impinging electron-beam-radiation upon said external surface of the drum from a location external to the drum to cure said electron-beam-curable material, the material of the drum itself being sufficiently shielding to prevent appreciable radiation generated by the stopping of the electron beam radiation in said electron-beam-curable material and the drum from passing through the drum, and means for stripping the electron-beam-curable material cured by the electron-beam-radiation from the drum as a cast film, said applying means applying the electron-beam-curable material directly to the external surface of the drum, said apparatus including means for covering the electron-beam-curable material with a carrier film drawn about the drum, and the stripping means separating the cast film from the carrier film after curing of the electron-beam-curable material.

23. Apparatus in accordance with claim 16, wherein the drum has means for cooling the same.

24. Apparatus for transfer-coating electron-beam-curable material, that comprises a rotary metal drum, means for applying an electron-beam-curable material to the external surface of said drum, and means for impinging electron-beam-radiation upon said external surface of the drum from a location external to the drum to cure said electron-beam-curable material, the material of the drum itself being sufficiently shielding to prevent appreciable radiation generated by the stopping of the electron beam radiation in said electron-beam-curable material and the drum from passing through the drum, said surface comprising layers of lead, tantalum and stainless steel.

25. Apparatus for transfer-coating electron-beam-curable material, that comprises, a rotary metal drum, means for applying said material directly to the external surface of said drum, means for impinging electron-beam-radiation upon the external surface of the drum from a location external to the drum to cure the material against the drum, and means for stripping the cured material from the drum as a self-supporting cast film.

26. Apparatus for transfer-coating electron-beam-curable material, that comprises, a rotary metal drum, means for applying said material to the external surface of said drum, means for impinging electron-beam-radiation upon the external surface of the drum from a location external to the drum to cure the material against the drum, and means for stripping the cured material from the drum as a cast film, said applying means applying the electron-beam-curable material to the external surface of the drum by pre-coating a carrier film drawn about the drum, and said stripping means separating the cast film from the carrier film after curing of the electron-beam-curable material.

27. Apparatus for transfer-coating electron-beam-curable matieral, that comprises, a rotary metal drum, means for applying said material directly to the external surface of said drum, means for impinging electron-beam-radiation upon the external surface of the drum from a location external to the drum to cure the material against the drum, and means for stripping the cured material from the drum as a cast film, said apparatus including means for covering the electron-beam-curable material with a carrier film drawn about the drum, the stripping means separating the cast film from the carrier film after curing of the electron-beam-curable material.

* * * * *